United States Patent [19]
Sasnett et al.

[11] Patent Number: 4,760,583
[45] Date of Patent: Jul. 26, 1988

[54] LASER DELIVERY SYSTEM

[75] Inventors: Michael W. Sasnett, Los Altos; Donald Bowes, Los Altos Hills; Richard J. Saunders, San Jose, all of Calif.

[73] Assignee: Coherent, Inc., Palo Alto, Calif.

[21] Appl. No.: 42,349

[22] Filed: Apr. 24, 1987

Related U.S. Application Data

[63] Continuation of Ser. No. 825,063, Jan. 31, 1986, abandoned, which is a continuation of Ser. No. 492,479, May 6, 1983, abandoned.

[51] Int. Cl.⁴ ................................................ H01S 3/00
[52] U.S. Cl. ..................................... 372/109; 372/36; 372/107
[58] Field of Search .................. 372/36, 107, 108, 109

[56] References Cited

U.S. PATENT DOCUMENTS

| | | | |
|---|---|---|---|
| 3,417,344 | 12/1968 | Grantham | 372/36 |
| 3,913,582 | 10/1975 | Sharon | 128/303.1 |
| 4,122,853 | 10/1978 | Smith | 128/303.1 |
| 4,399,541 | 8/1983 | Kovats et al. | 372/36 |

Primary Examiner—William L. Sikes
Assistant Examiner—Robert E. Wise
Attorney, Agent, or Firm—Ronald L. Yin

[57] ABSTRACT

An improved gas laser is disclosed. The laser has a support tube to support and to maintain the alignment of the optical resonator structure. The gas lasing medium is used within the support tube to maintain the tube at a substantially constant temperature above the ambient. Furthermore, an active temperature controller is disclosed. The temperature controller maintains the gas lasing medium in the support tube at a substantially constant temperature. An active pressure controller is also disclosed. The active pressure controller uses a pressure sensor, an electronic processor, and a motor-driven needle valve to maintain the pressure of the gas lasing medium in the laser within the desired operating pressure range. The laser can also be switched in operation from a continuous mode to a pulsing mode. An active power control system is disclosed wherein the power output of the laser, through an active feedback loop is maintained at the desired level. Because the optical resonator structure is light weight, it can be mounted on a mechanical assembly. The beam is delivered to a desired location by the mechanical assembly. Finally, a distributive lasing system comprising a centralized pump delivering the lasing medium to a plurality of remotely located optical resonator structures is disclosed.

16 Claims, 11 Drawing Sheets

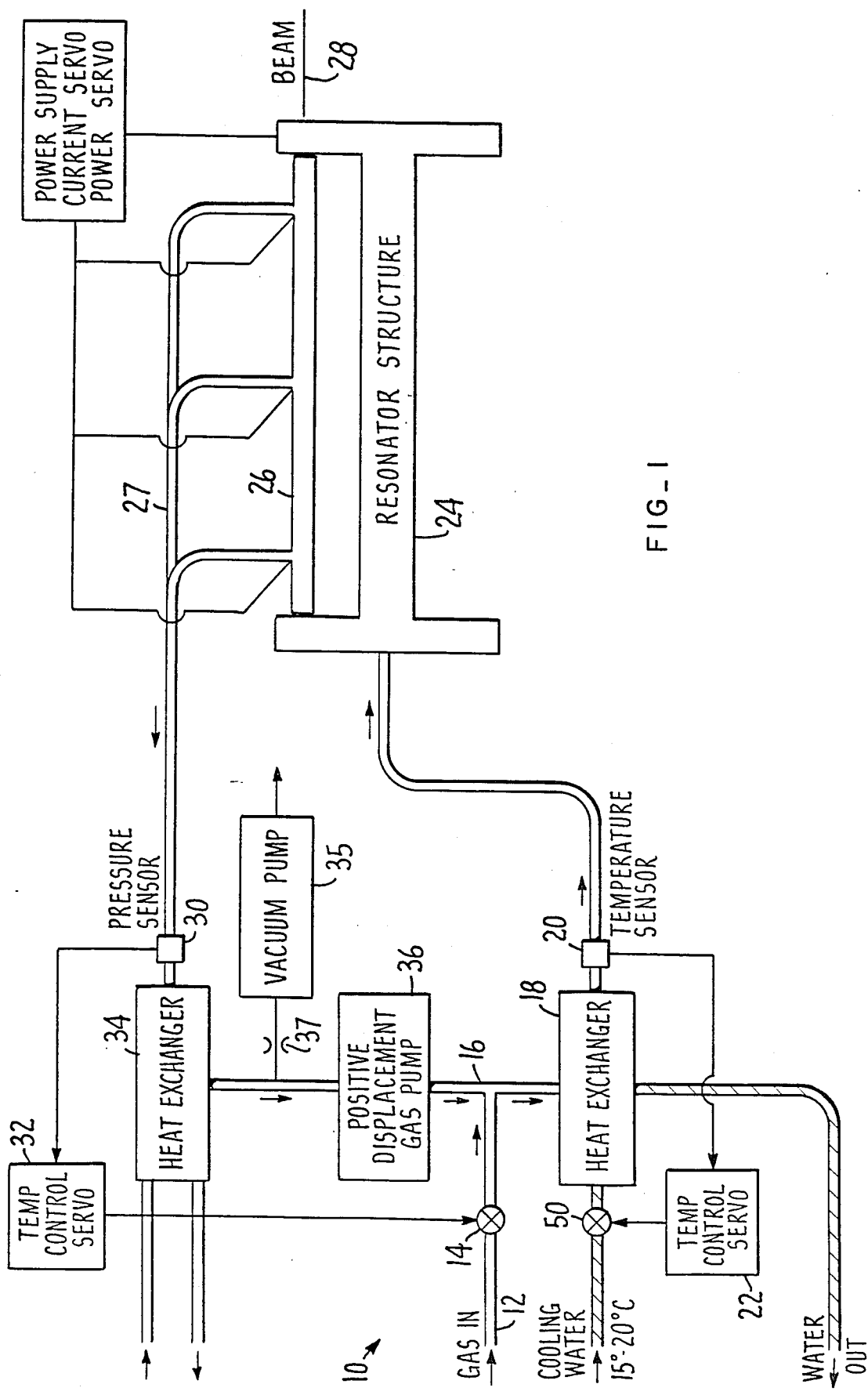
FIG_1

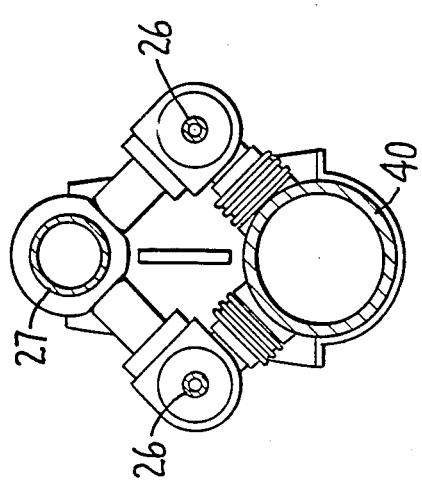
FIG_2b
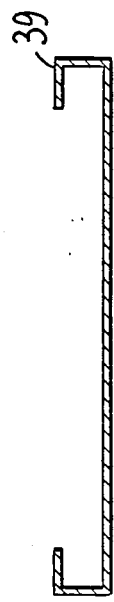
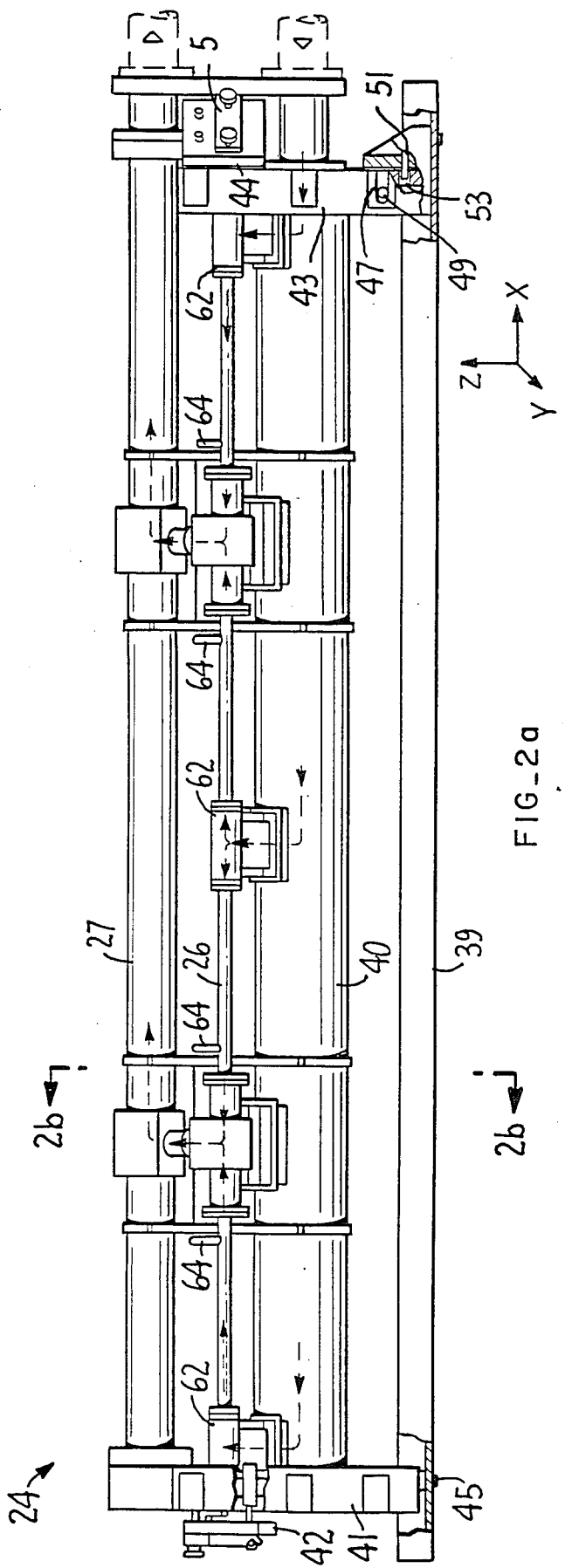
FIG_2a

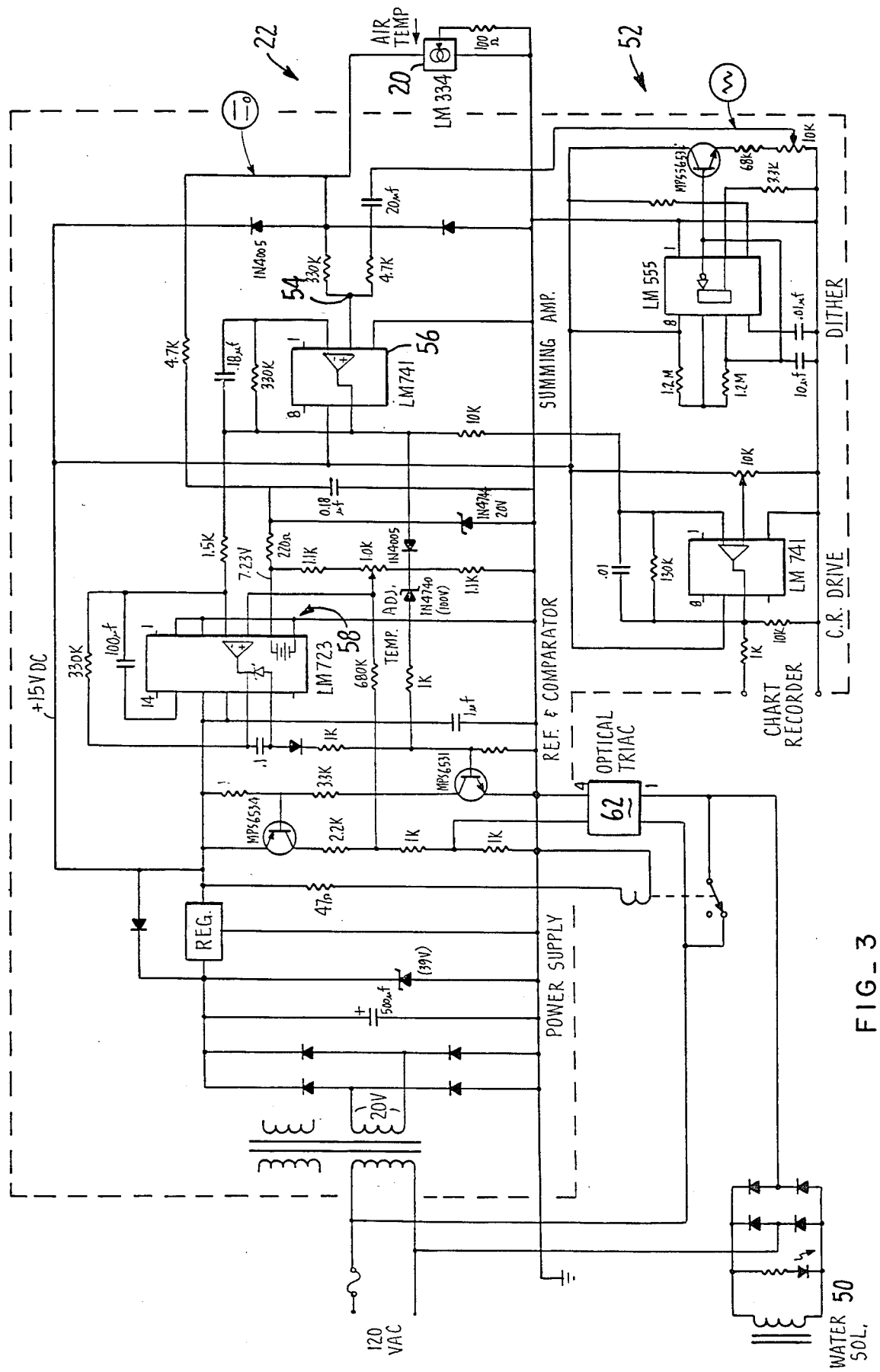
FIG_3

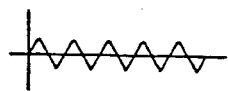
FIG_4a
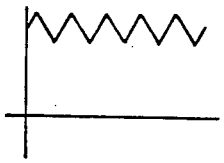
FIG_4b
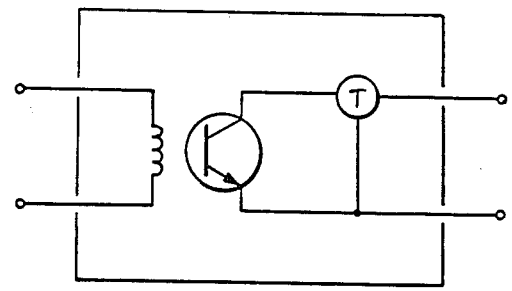
FIG_6
FIG_4c
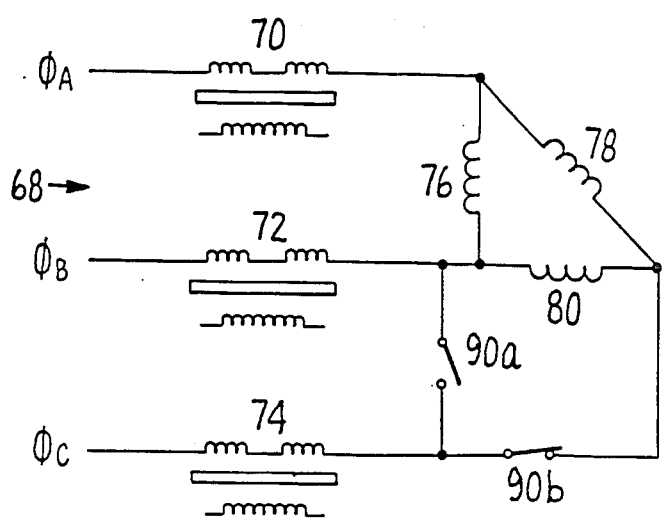
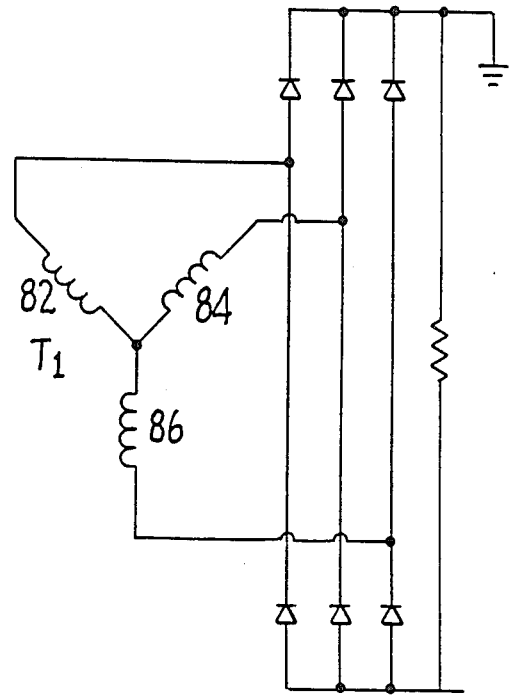
FIG_5

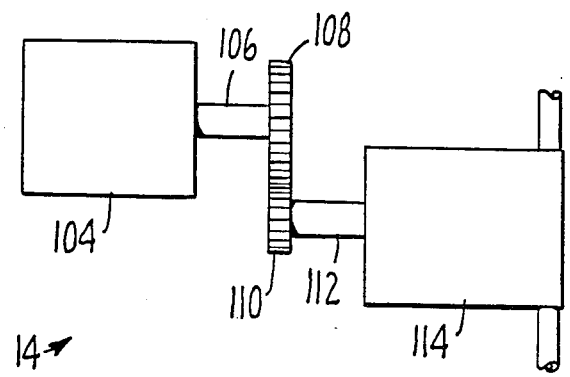
FIG_7
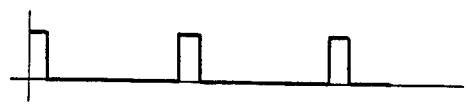
FIG_9a
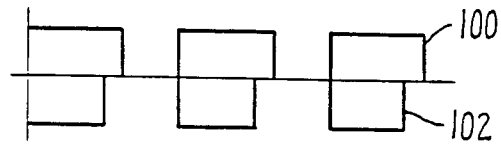
FIG_9b
FIG_9c
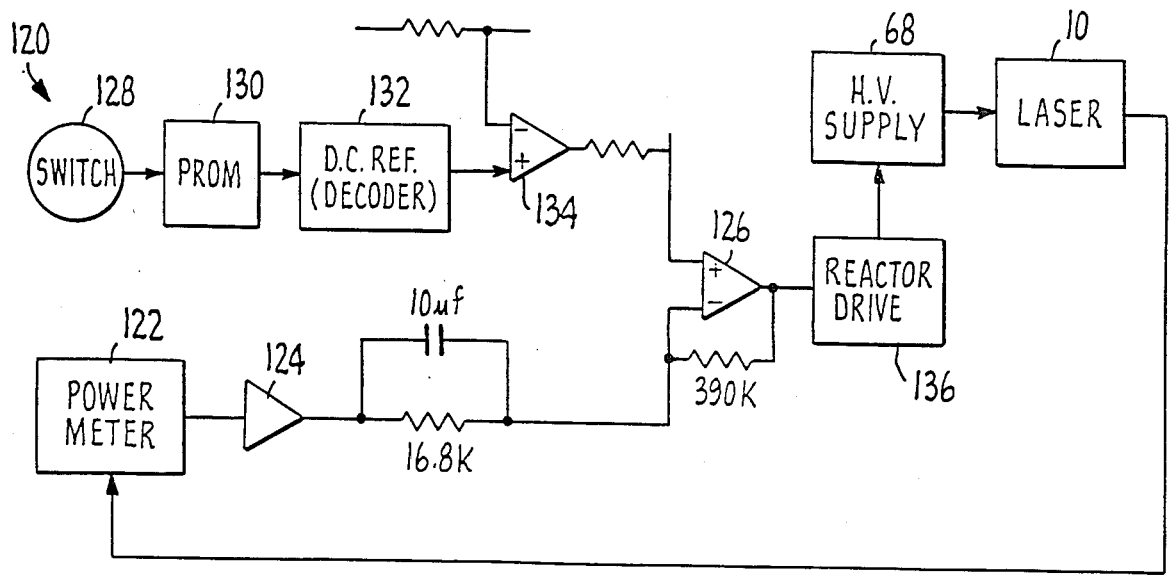
FIG_10

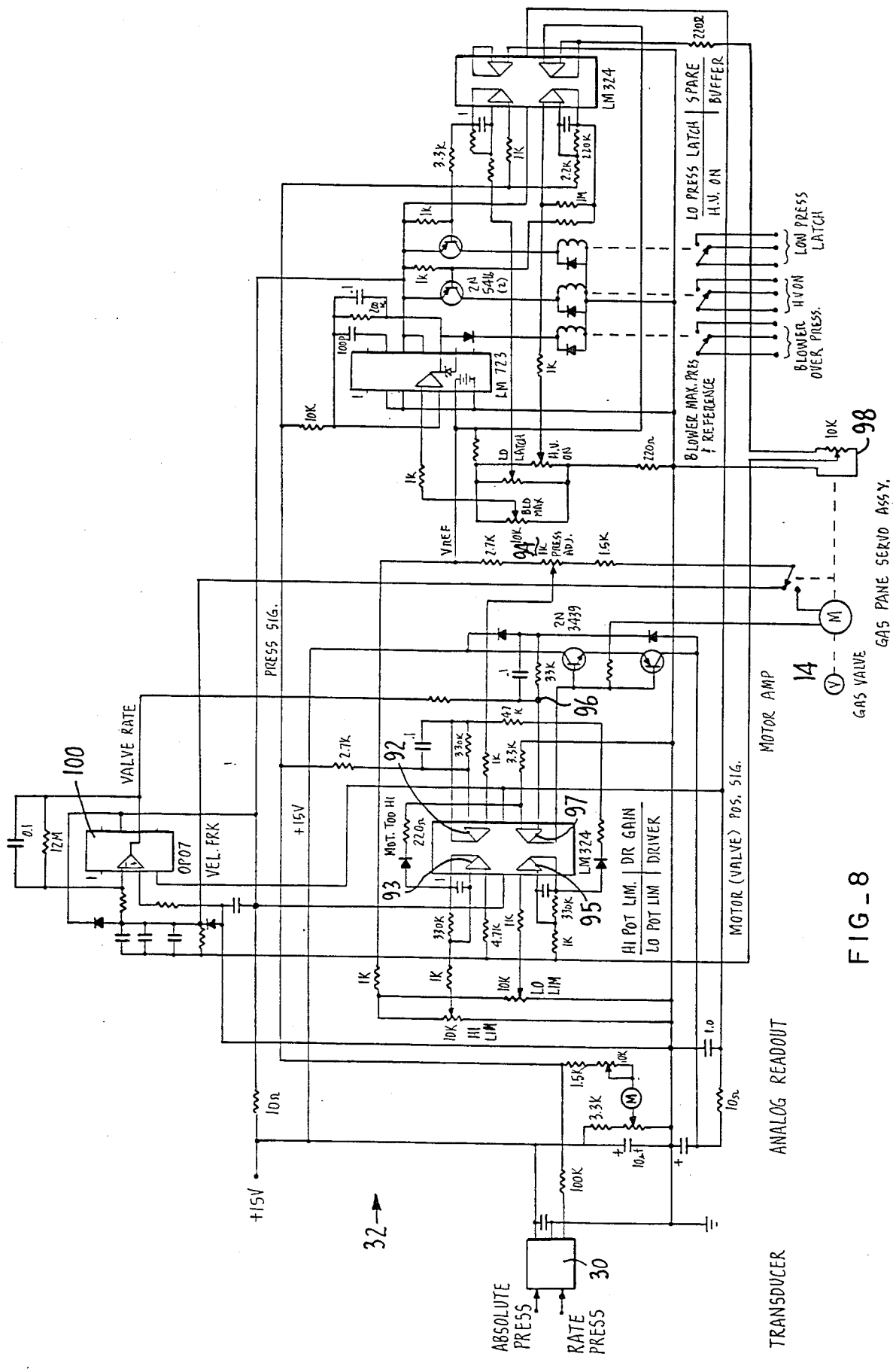
FIG_8

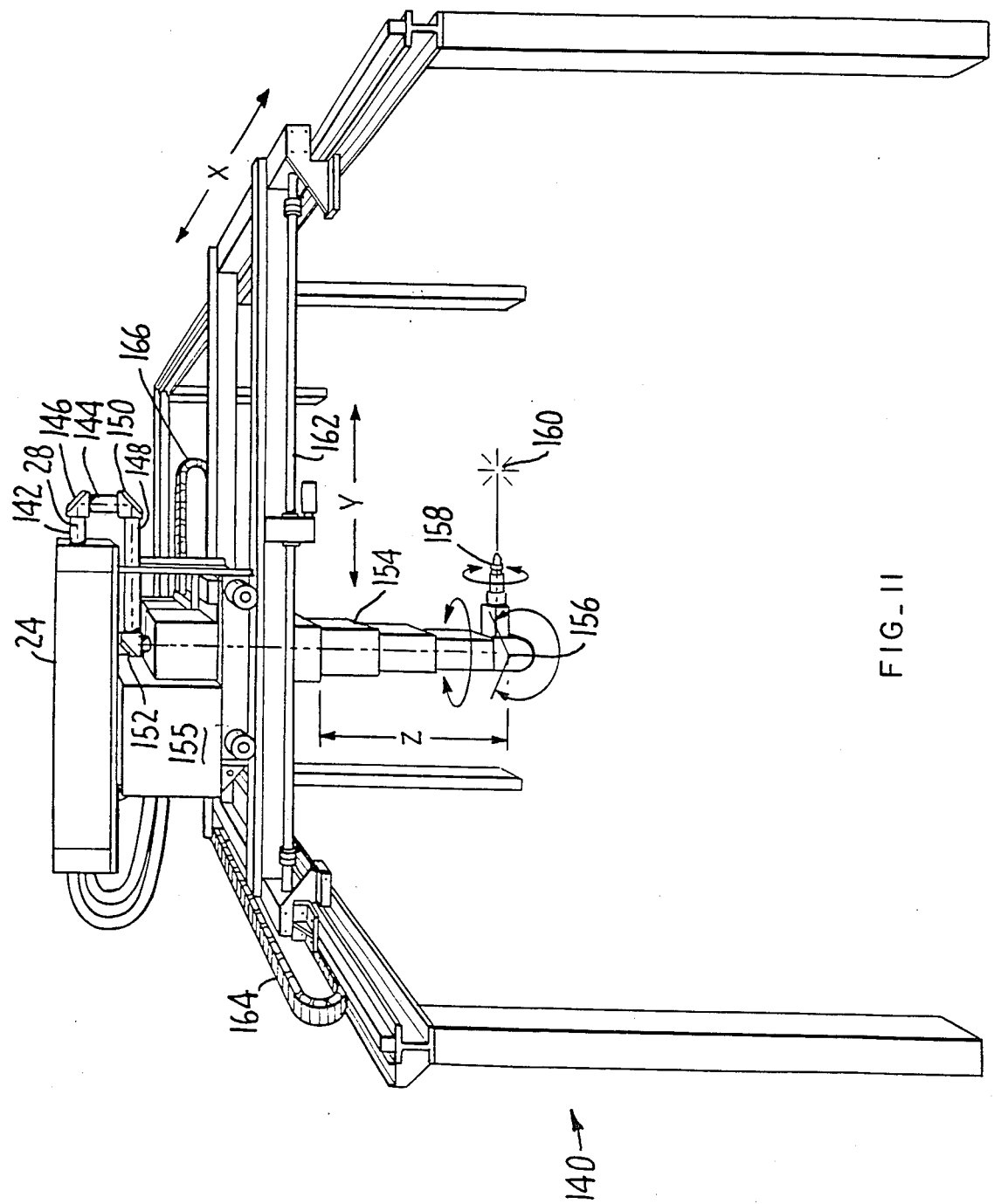
FIG_11

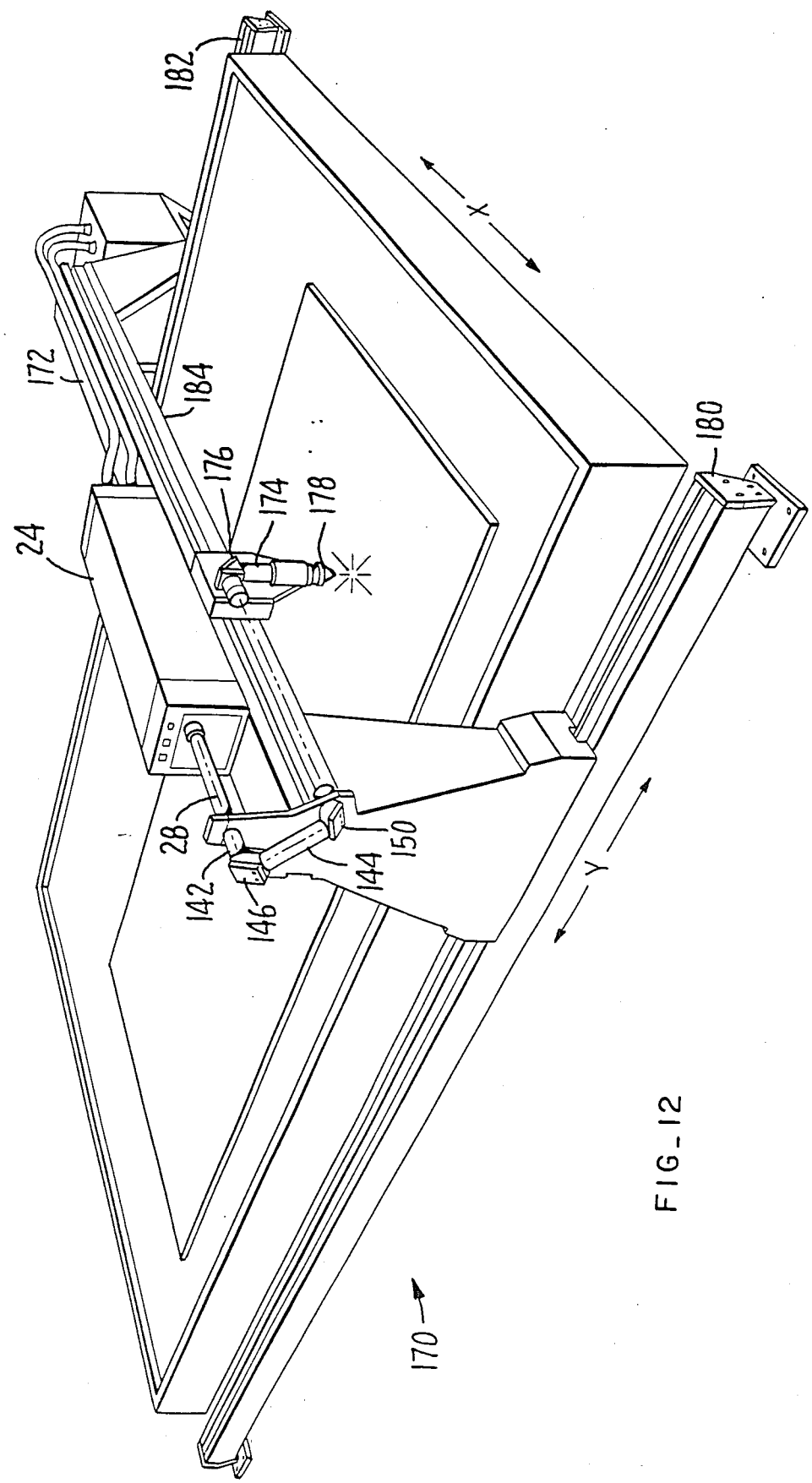
FIG_12

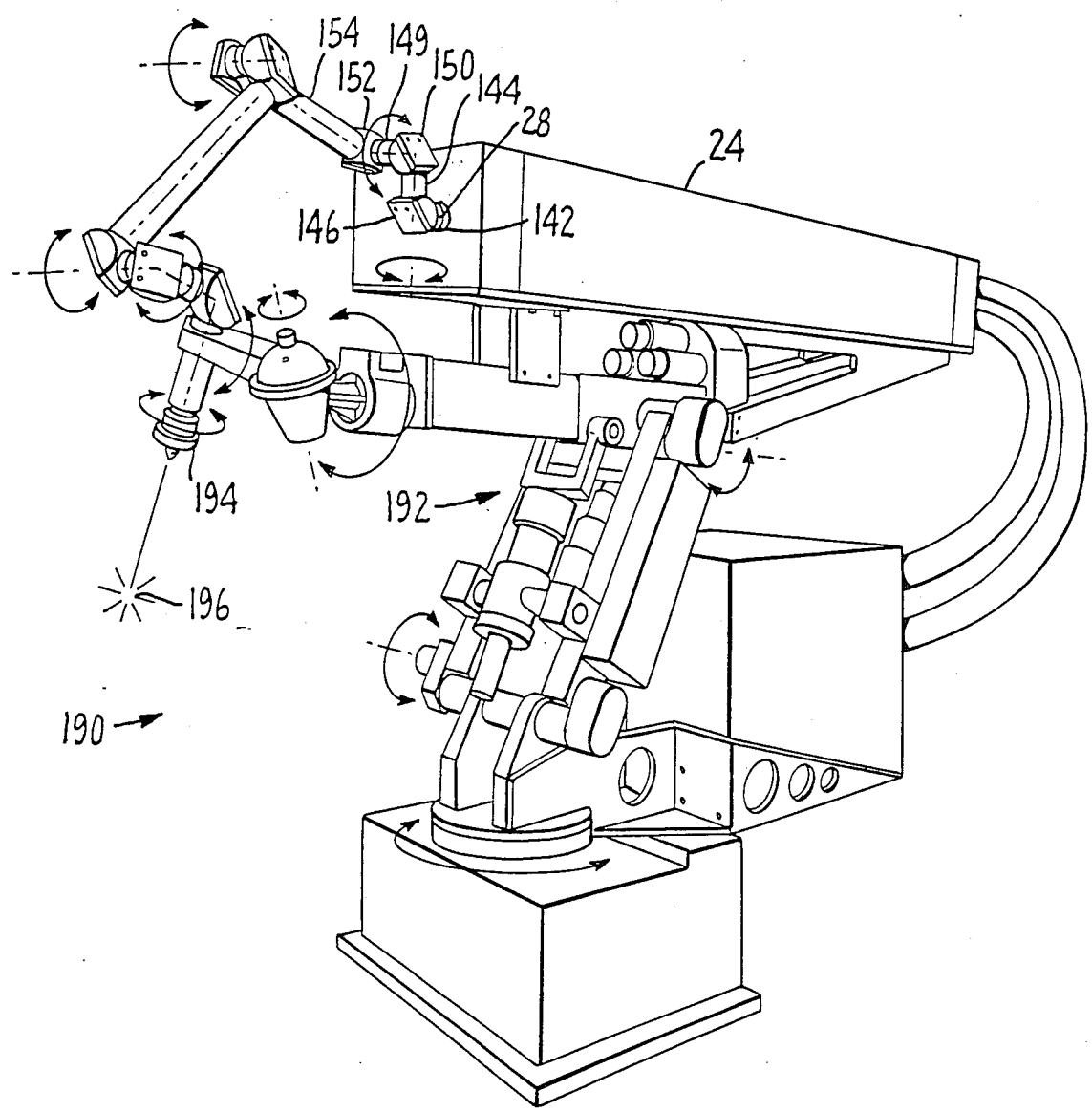
FIG_13

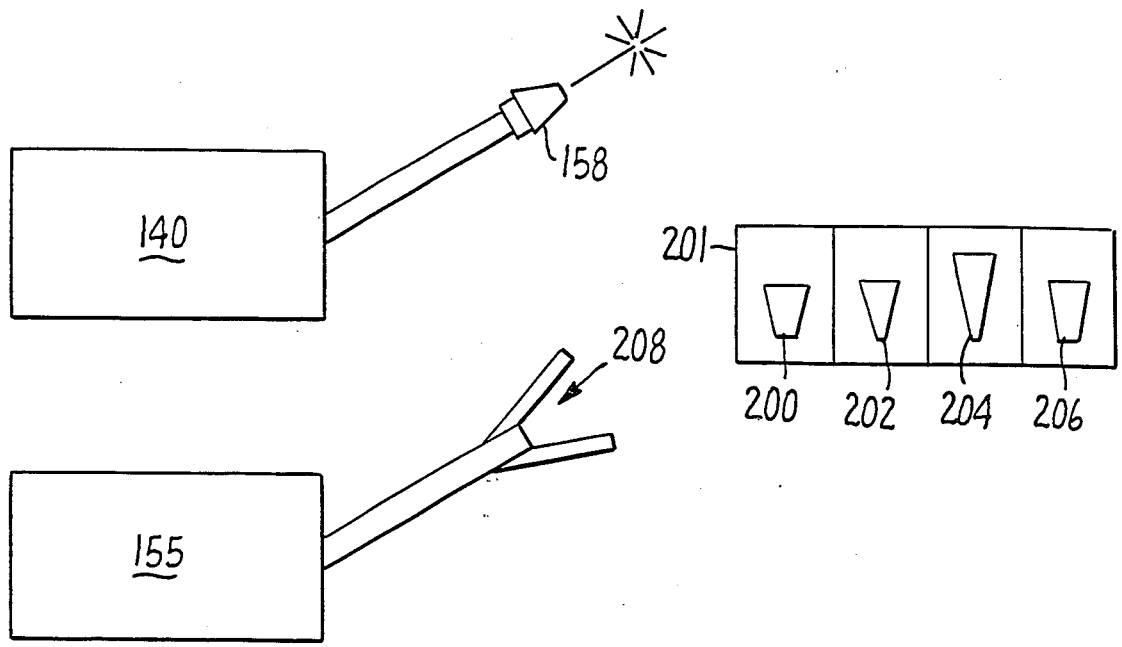
FIG_15
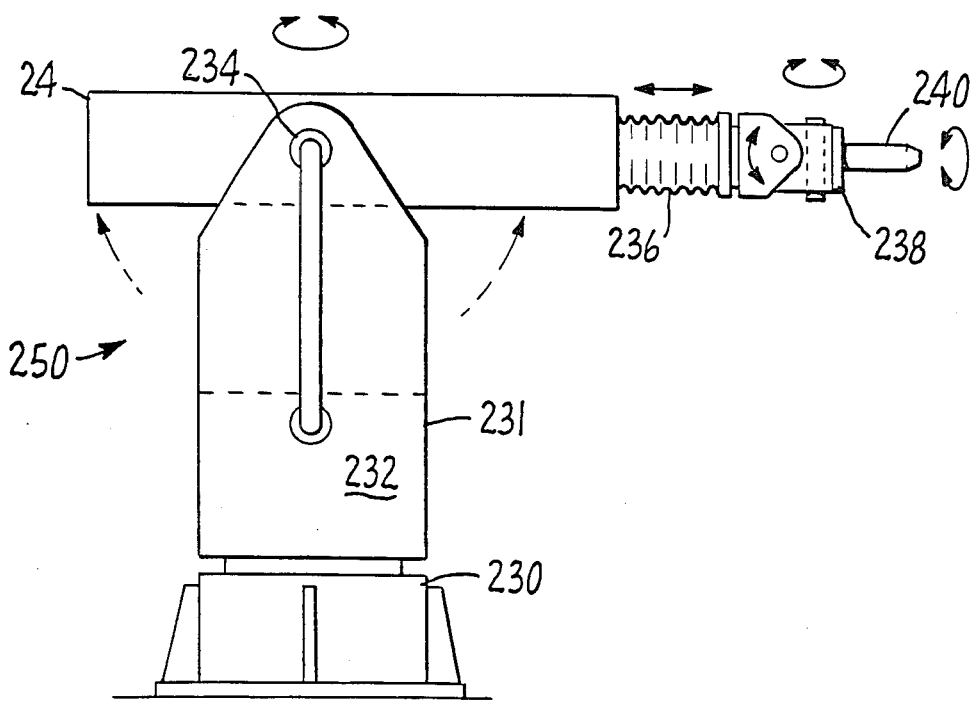
FIG_14

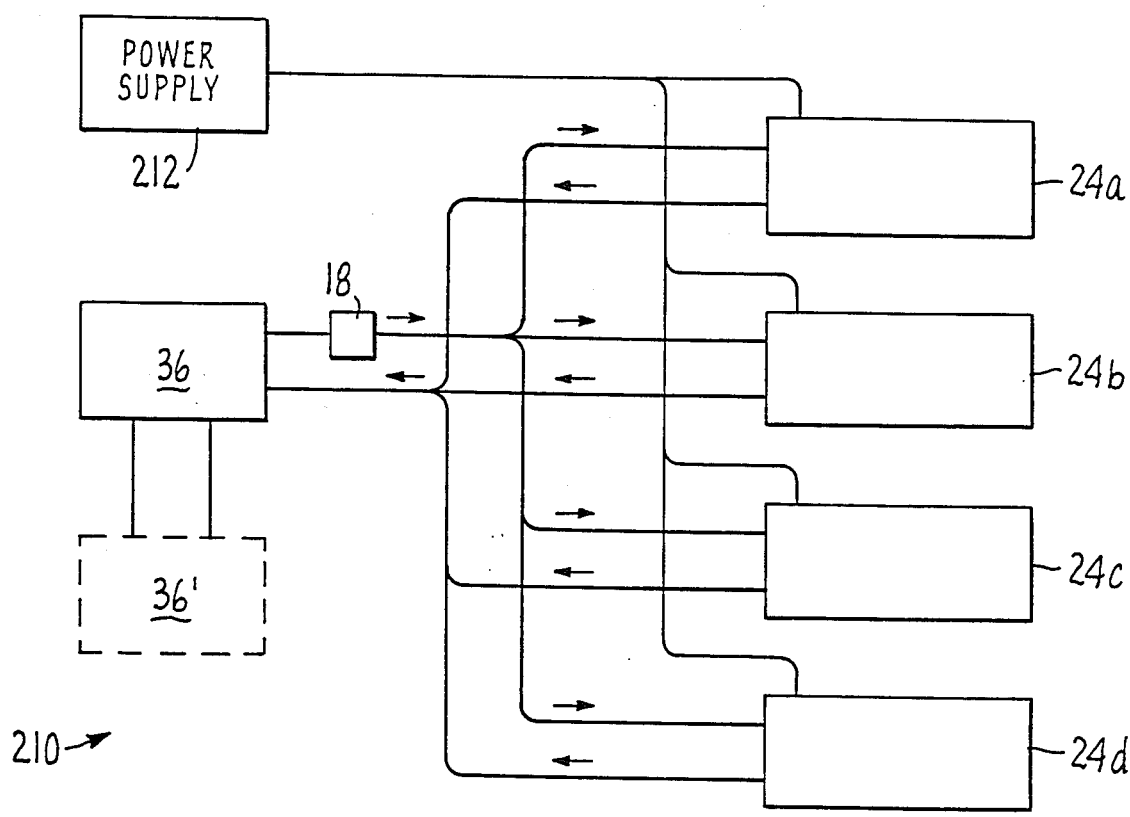
FIG_16a
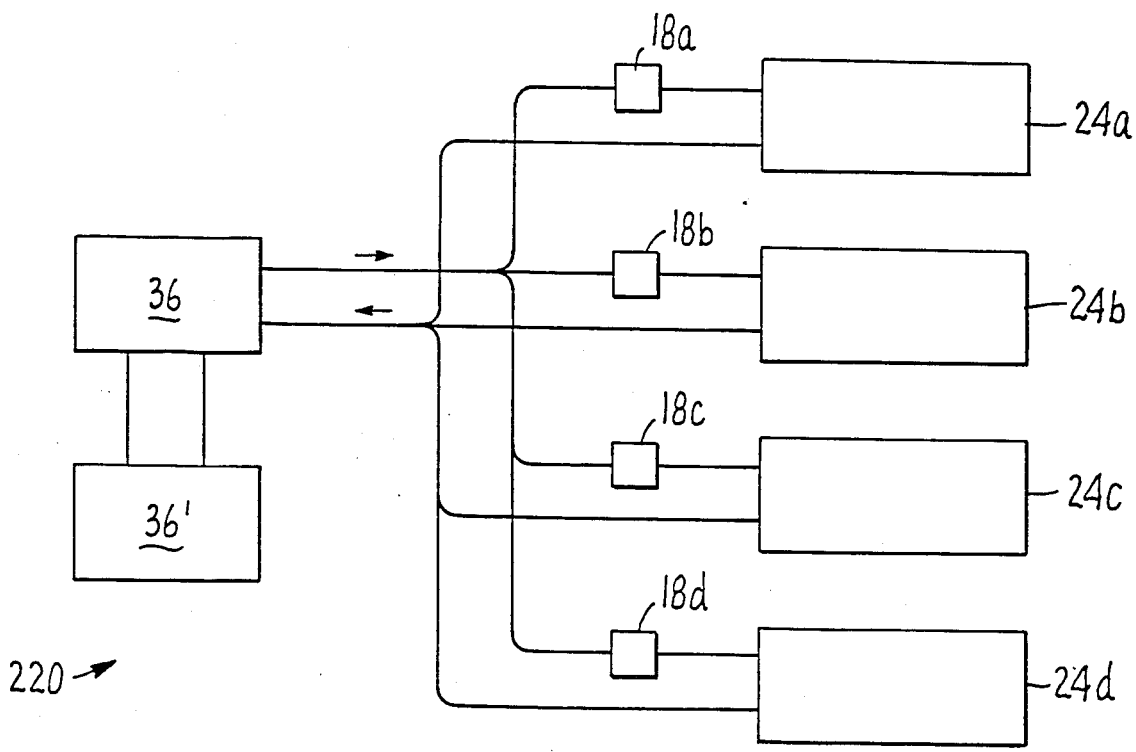
FIG_16b

LASER DELIVERY SYSTEM

This is a continuation of application Ser. No. 825,063, filed Jan. 31, 1986, now abandoned which is a continuation of application Ser. No. 492,479, filed May 6, 1983 now abandoned.

DESCRIPTION

1. Technical Field

The present invention relates to an improved laser, and/or components thereof. More particularly, the present invention relates to an improved $CO_2$ laser and components thereof.

2. Background of the Invention

A laser has many components. Because a laser is a precision instrument, many of these components must be of high precision. One such component is the optical resonator structure. The optical resonator structrre has a cavity in which the active lasing medium is excited to produce the beam of coherent radiation. At one end of the optical resonator cavity is a first highly polished mirror, which is nearly one hundred percent (100%) reflective; a second highly polished mirror is at the other end, which is less reflective than the first mirror and permits some of the radiation to be transmitted therethrough. Coherent radiation generated within the optical resonator cavity is reflected from the first mirror to the second mirror until sufficient amount of energy of coherent radiation is generated and is transmitted through the second mirror.

Because the optical resonator structure must be aligned such that photons of radiation reflected from one mirror is incident on the other mirror, the structure must be extremely precisely aligned. Any misalignment can cause the laser to produce a reduced output or even to fail to generate a beam of laser radiation. The optical resonator structure must be precisely aligned, even when it is subjected to variation in alignment and position due to variations in the ambient temperature. In addition, heat generated within the optical resonator cavity caused by the excitation of the lasing medium can cause the optical resonator structure to become misaligned or mispositioned.

In the prior art, it is known to use a stablizing fluid, such as water or oil, which is heated to a fixed temperature and passed into the optical resonator structure to maintain the structure at a fixed temperature. This, however, requires the use of a fluid which is different from the lasing medium, thereby necessitating another set of plumbing fixtures and the like. In addition, the temperature of the stablizing medium is generally maintained by a simple thermostatic heater. To our knowledge, there has never been a laser using a temperature stablizing lasing medium whose temperature is actively controlled. By active control, it is meant that the temperature is sensed, is compared to a fixed reference, and in response to the comparison, the temperature of the fluid is changed, all of which is done in a closed loop feedback control configuration.

Another component of a laser is the power-supply. The power supply generally comprises a plurality of lines (usually three) connected to a three-phase power source. These plurality of lines are connected to a set of primary coils (also usually three), which are wound about a transformer. A plurality of secondary coils (also usually three) are also wound about the transformer. The transformer increases the voltage of the secondary coil from the primary coils. In the prior art, to control the mode of operation of the laser from continuous to pulsing, usually a control device, such as a vacuum tube, is used. Since a vacuum tube runs on DC voltage, and since the power supplied to the primary coils is AC in nature, the vacuum tube is placed in the circuit after the secondary coils. Since the secondary coils receive an increased voltage from the transformer (usually on the order of tens of thousands of volts), the vacuum tube must be suitable for such high voltage application. Necessarily, these tubes are expensive.

To our knowledge, in the prior art, there has not been any system to control the power output of a laser in response to the desired level of power output. In addition, to our knowledge, there is no laser system having an active pressure control loop to control tne pressure of the gas lasing medium.

In September of 1982 at the International Machine Tool Show in Chicago, Ill., a system was disclosed wherein a fixed laser generated a fixed beam of coherent radiation. A robot having an articulated arm moved a work piece in and out of the beam of coherent radiation to effectuate various cutting and scribing actions onto the work piece as a result of the relative movement of the fixed beam of coherent radiation and the movable work piece. In the medical area, a laser generating a beam of coherent radiation has been delivered to a desired location by passing the beam of coherent radiation through an articulated arm wherein the movement of the articulated arm moves the beam. However, to our knowledge, in the prior art, there has not been any industrial system to deliver a beam of coherent radiation to a desired location by a mechanical assembly which comprises a plurality of coupled structural members in one of which the laser is located. The movement of the assembly moves the laser and the beam to deliver the beam to the desired location. Finally, to our knowledge, there is no prior art relating to a distributive lasing system wherein a centralized pump and power supply delivers the electrical power and the active gas lasing medium to a plurality of remotely located optical resonator structures to activate the lasing action.

SUMMARY OF THE INVENTION

An apparatus for delivering a beam of coherent radiation to a desired location is disclosed. The apparatus comprises a laser means for generating the beam. A mechanical assembly comprises a plurality of coupled structural members with each structural member linked for relative movement with another of the structural members to form a plurality of joints. A mirror means is positioned in one of these joints, wherein the relative movement of the structural members forming the joint moves the mirror means. The beam of coherent radiation is aligned from the laser to impinge the mirror means and to reflect therefrom such that the movement of the assembly delivers the reflected beam to the desired location.

DETAILED DESCRIPTION OF THE INVENTION

FIG. 1 is a schematic overall view of an improved laser, incorporating the present invention.

FIG. 2a is an enlarged view of the optical resonator structure of FIG. 1.

FIG. 2b is a cross-sectional view taken along the line b—b of FIG. 2a.

FIG. 3 is a circuit diagram of an active temperature controller.

FIG. 4 (a-c) are various waveforms representing the signals at various locations of the circuit shown in FIG. 3.

FIG. 5 is a schematic circuit diagram of the power supply used in the laser of FIG. 1.

FIG. 6 is a schematic circuit diagram of a type of switch suitable for use in the power supply shown in FIG. 5.

FIG. 7 is a side view of the mechanical coupling of a motor and a needle valve used in a pressure regulator for the laser of FIG. 1.

FIG. 8 is a schematic circuit diagram of the active pressure controller for controlling the pressure of the gas in the laser shown in FIG. 1.

FIG. 9(a-c) are timing diagrams for various components of the circuit shown in FIG. 8.

FIG. 10 is a schematic circuit diagram of a power control system used in the laser in FIG. 1.

FIG. 11 is a perspective view of a laser beam delivery apparatus.

FIG. 12 is a perspective view of another laser beam delivery apparatus.

FIG. 13 is a perspective view of yet another laser beam delivery apparatus.

FIG. 14 is a side view of still yet another laser beam delivery apparatus.

FIG. 15 is a block diagram of an apparatus for interchanging a component of the laser beam delivery apparatus.

FIG. 16a-b are schematic block diagrams of laser distributive systems having a plurality of optical resonator structures and a centralized pump and power supply.

DETAILED DESCRIPTION OF THE INVENTION

Referring to FIG. 1, there is shown an overall view of an improved laser 10. Although the discussions set forth hereinafter will relate to a $CO_2$ type of laser, it should be apparent that the invention is not so limited. In particular, the invention can be used in any type of laser having a fluid lasing medium.

The gas laser 10 comprises a gas inlet 12 for introducing the gas lasing medium into the laser 10. In a $CO_2$ type laser, the gas is a mixture of $CO_2$, $N_2$ and He, although the active lasing medium is the $CO_2$ gas. The gas is introduced into the inlet 12 and passes through a motor-driven needle valve 14 for controlling the flow of the gas passing through the needle valve 14. This will be explained in greater detail hereinafter. The gas is then combined with recycled gas from the recirculated pipe 16 and is introduced into a first heat exchanger 18. A cooling fluid, such as water, is also introduced into the first heat exchanger 18 to cool the temperature of the gas. From the first heat exchanger 18, the gas is passed across a temperature sensor 20, which supplies a signal to a temperature control processor 22 which will also be explained hereinafter. From the temperature sensor 20, the gas is introduced into the optical resonator structure 24.

Within the optical resonator structure 24, the gas is passed into a discharge tube 26. Within the gas discharge tube 26 the lasing action of the gas is produced, generating a beam 28 of coherent radiation. From the discharge tube 26, the gas is then supplied to an exhaust tube 27. The gas is then passed through a pressure sensor 30 which, with the pressure controller 32, controls the pressure of the gas within the laser 10. After passing through the pressure sensor 30, the gas passes through a second heat exchanger 34. The gas is then pumped by a pump 36 and is recycled along with the new gas from the gas inlet 12. The pump 36 is a positive displacement "Roots" type pump. A small vacuum pump 35 of the rotating vane type maintains the gas mixture at about 60 torr, by continually drawing off a small amount of gas through an orifice 37.

OPTICAL RESONATOR STRUCTURE

Referring to FIG. 2a, there is shown the optical resonator structure 24 in greater detail. The optical resonator structure 24 comprises a support tube 40, into which the gas lasing medium is first introduced. The gas flow is indicated generally by the arrow. The support tube 40 aligns and supports the optical resonator structure 24 with a first mirror 42 positioned on a first end bracket 41 at one end of the support tube 40 and a second mirror 44 positioned on a second end bracket 43 at the other end of the support tube 40. The support tube 40 is attached to each end bracket 41 and 43, and is positioned substantially parallel to the discharge tube 26. Gas from the support tube 40 is passed to the discharge tube 26 substantially near the ends of the support tube 40 and of the discharge tube 26 in a radial direction from the support tube 40 to the discharge tube 26. Once the gas is introduced into the discharge tube 26, they then flow axially away from the ends of the discharge tube 26. Away from the ends of the discharge tube 26, the gas from the discharge tube 26 is passed to the exhaust tube 28.

As shown in FIG. 2b, there are two discharge tubes 26 in communication with the support tube 40 and the exhaust tube 27. Any number of discharge tubes 26 can be placed parallel to the support tube 40 and in communication therewith. However, preferably, the discharge tubes 26 are positioned axially spaced from one another by approximately 90 degrees. Also preferably for structural support, the support tube 40 should be positioned substantially near the center of the optical resonator structure 24 to achieve the greatest stability and alignment.

In order to achieve the greatest stability and support for the optical resonator structure 24, gas within the support tube 40 is maintained at a substantially constant temperature. Furthermore, preferably, the temperature of the gas within the support tube 40 is maintained above the ambient temperature.

With the gas in the support tube 40 maintained at a constant temperature, the stability of the optical resonator structure 24 and the alignment of the first and second mirrors 42 and 44 and the folding mirrors 5 (only one is shown) are less likely to be affected by temperature variations in the ambient or in the structure 24 caused by the excitation of the gas in the discharge tube 26.

Within the discharge tube 26 are a plurality of anodes 62 and cathodes 64. The anodes 62 and cathodes 64 are preferably spaced approximately 16.5 inches apart. The discharge tube 26 is preferably 74 inches in length, thereby accommodating four (4) anode-cathode sections. The outer diameter of the discharge tube is preferably 5¼" with an inner diameter of 4½". The anodes 62 are positioned substantially near the ends of the discharge tube 26 and near the gas inlet from the support tube 40. The cathodes 64 are positioned away from the ends of the discharge tube 26 near the gas exhaust from the discharge tube 26 to the exhaust tube 27. In the event more than one discharge tube 26 is used, the folding mirrors 5 or deflecting mirrors are used to provide increased output power.

To provide overall physical stability, the optical resonator structure 24 is made out of rigid cast aluminum. As a result, the structue 24 is of light weight. The end brackets 41 and 43 are kinematically mounted on support member 39. The support member 39 is generally parallel with the support tube 40 and with the discharge tubes 26 and the exhaust tube 27. The first end bracket 41 is rigidly fastened onto the support member 39. A mounting bolt 45 bolts the first end bracket 41 to the structural member 39. The bolt 45 is fastened such that it prevents any movement of the end bracket 41 in any direction. The second end bracket 43 has a slot 47 therein. A slot 47 is located on each side of the second end bracket 43 (only one is shown in FIG. 2a). The slot 47 is generally in the x direction (as shown in the direction diagram of FIG. 2a). A mounting bolt 49 on the structural member 39 is passed through the slot 47. The bolts 49 passing through the slot 47 permit the second end bracket 43 to move in the x and y directions. The bolts 49 prevent the second end bracket 43 from moving in the z direction. Substantially near the center of the second end bracket 43 is a hole 53 through which an alignment pin 51 passes (as shown in the cut-away section of FIG. 2a). The alignment pin 51, through the slot 53, prevents the second end bracket 43 from moving in the y direction. The overall effect of the bolts 49 and the alignment pin 51 is to permit the second end bracket 43 to move only in the x direction. Thus, when there is thermal expansion of the optical resonator structure 24, due to increase in temperature, the support tube 40 moves the first and second end brackets 41 and 43 relative to one another only in the x direction. The movement of the first and second mirrors 42 and 44 in the x direction, which is generally parallel to the axial direction of the discharge tube 26, maintains the alignment of the mirrors for the photons to reflect from one mirror to the other.

TEMPERATURE CONTROLLER

To maintain the temperature of the gas within the support tube 40, a temperature controller is provided. The temperature controller comprises a temperature sensor 20, an electronic processor 22, and a solenoid 50 for controlling the flow of the water into the first heat exchanger 18 to cool the gas.

Referring to FIG. 3, there is shown a schematic circuit diagram of the temperature control processor 22. The temperature sensor 20 measures the temperature of the gas and produces a first signal in response thereto. The temperature sensor 20 is an industry component designated as LM334. A portion of the temperature processor 22 comprises a circuit known as a "dither" 52. The dither 52 produces a saw-tooth waveform which varies approximately every 30 seconds. This is shown in FIG. 4a. The saw-tooth signal from the dither 52 and the first signal from the temperature sensor 20, which is a DC signal, are combined at a summing junction 54. The summing junction 54 simply adds the two signals together. An example of the waveform at the junction 54 is illustrated in FIG. 4b. The combined signal from the summing junction 54 is supplied to an operational amplifier 56, which merely isolates the signal from the rest of the system.

From the operational amplifier 56, the summed signal is supplied to a comparator 58. The comparator 58 is an industry part LM723. It has an internal reference voltage and an outside potentiometer can be attached to the internal voltage reference to adjust it. The outside potentiometer can adjust the internal voltage to a level which is representative of a reference temperature. The comparator 58 compares the summed signal to the reference signal to produce a drive signal. The comparator 58 compares the two signals by subtracting the reference signal from the summed signal. An example of the waveform from the comparator 58 is shown in FIG. 4c. The drive signal is then supplied to the solenoid 50 through an optical SCR switch 62. The optical SCR switch is a component D2402 made by I. R. Crydom.

The drive signal from the comparator 58 which is supplied to the solenoid 50 is a DC signal with a sawtooth signal superimposed thereon. The saw-tooth signal turns on the solenoid approximately every 30 seconds. The length of the "on" period is determined by the DC level. Thus, if the drive signal from the comparator 58 were small, the solenoid 50 would nevertheless be turned on every 30 seconds for a momentary period of time. An example of this is shown in FIG. 4c. By having the solenoid 50 activate at a fixed rate but for a variable period of time, the temperature bandwidth is decreased.

In the prior art, a thermostat normally varies between two temperature values: a first temperatrre and a second temperature. When the temperature of the medium reaches a first temperature, the thermostat will open to cool it. When the temperature of the medium reaches a second temperature, the thermostat will close to prevent further cooling. The switch between the two temperature values is of constant amplitude. Only the amount of time during which the switching operation is performed is varied.

In contrast, in the temperature control processor 22, the solenoid 50 is forced to switch at a constant rate, but at a variable pulse width, thereby decreasing the temperature amplitude. This reduces the variation between the first temperature and the second temperature; i.e., the temperature at which the gas medium should be cooled and the temperature at which the cooling process should be stopped. Thus, a more accurate temperature controller is acheived.

In the preferred embodiment, the temperature of the gas is maintained at level above the ambient.

medium shculd be This avoids fluctuation of temperature of the gas caused by variation in temperature of the cooling fluid.

POWER SUPPLY SYSTEM

Referring to FIG. 2a, there is shown the gas discharge tube 26. Positioned within the gas discharge tube are a plurality of anodes 62 and a plurality of cathodes 64. For a $CO_2$ laser, to cause the lasing of the gas medium within the gas discharge tube 26, a high voltage DC source (typically on the order of tens of thousands of volts) must be supplied to the anodes 62 and cathodes 64.

Referring to FIG. 5, there is shown a schematic circuit diagram of a power supply system 68 for supplying high voltage DC power to the electrodes 62 and 64 in the discharge tube 26. The power supply system comprises a first, a second and a third lead ($\phi_A$, $\phi_B$, $\phi_C$, respectively). The first lead $\phi_A$ is connected to a first saturable reactor 70. The second lead $\phi_B$ is connected to a second saturable reactor 72. The third lead $\phi_C$ is connected to a third saturable reactor 74. The leads $\phi_A$, $\phi_B$, and $\phi_C$ are connected to a plurality of primary coils 76, 78 and 80 of a transformer $T_1$. Three secondary coils 82, 84 and 86 are also connected to the transformer $T_1$. The output of the secondary coils 82, 84 and 86 are connected through a diode bridge comprising a plurality of diodes to form the DC power supply. This is the high voltage which is supplied to the electrodes 62 and 64 within the discharge tube 26. The foregoing described prior art power supply system 68, when connected to a three-phase power source (e.g. 480 volts A.C.) and the system 68 is in operation, will cause the gas laser 10 to operate in a continuous mode, i.e., the beam 28 of coherent radiation produced from the discharge tube 26 is generated continuously.

We have found that, by simply adding a switch, for example 90a, which connects between any of the two leads, for example, and $\phi_B$ and $\phi_C$, or a switch, for example 90b, in one of the leads, for example, $\phi_C$, from the primary coils to the power source, will cause a change in the flux pattern in the transformer $T_1$. More particularly, the change in the flux pattern results in an asymmetrical flux flow in the transformer $T_1$. The result of an asymmetrical flux pattern in the transformer $T_1$ is that when the power supply system 68 is connected to the electrodes 62 and 64 in the discharge tube 26, the laser 10 will operate in a pulsing mode. In the event the leads $\phi_A$, $\phi_B$ and $\phi_C$ were connected to a 60 Hz three-phase power source, and either switch 90a is introduced shorting the leads $\phi_B$ and $\phi_C$, or switch 90b is added opening the lead $\phi_C$, a pulsing rate of 120 HZ is observed.

The switch 90a or 90b can be an optical SCR switch, such as the D2402 from I. R. Crydom, as previously described. The schematic circuit for such a switch is shown in FIG. 6.

ACTIVE PRESSURE CONTROLLER

The active pressure controller for the laser 10 comprises a pressure sensor 30, a pressure control processer 32 and a motor driven valve 14. This is shown in FIG. 8. The pressure of the gas in the laser 10 is crucial in order to maintain the proper output of the gas discharge tube 26. Also, the vacuum pump 35 pumping through a small orifice 37, is continually draining the laser 10 of a small percentage of its gas load. This leadrate is replenished through the motor driven valve 14.

The sensor 30 is a solid state, temperature compensated pressure transducer. The preferred embodiment of the pressure sensor is a 142PC15A, commercially available from Microswitch/Honeywell. The pressure transducer 30 generates a first voltage signal which is proportional to the pressure of the gas. The output of the transducer 30 increases monotonically with the absolute pressure.

The first signal from the pressure sensor 30 is supplied to a first operational amplifier 92 (shown in the upper right hand portion of the first LM324). The first operational amplifer 92 is a DC comparator whose output is proportional to the error difference between pressure transducer output voltage (from the sensor 30) and pressure reference level setpoint (from the first adjustable potentionmeter 94). A summing junction 96 follows the first operational amplifier 92. The first operational amplifier 92 supplies the summing junction 96 with the signal necessary to maintain DC pressure level during normal long term operation.

A second potentiometer 98 is directly connected to the gear train of the motor and gas flow valve 14. The second potentiometer 98 is driven by a DC level and the output of the second potentiometer provides a signal proportional to the valve opening. A second operational amplifier 100 is connected in parallel with the first operational amplifier 92 and translates the second potentiometer 98 output signal into a second signal proportional to rate of change of inlet gas flowrate. This provides a velocity feedback signal to the summing junction 96 that is necessary for stable operation.

A third operational amplifier 93 provides as its output a voltage proportional to the position of the second potentiometer 98 and therefore of the gas flow control valve. A fourth operational amplifier 95 also provides a voltage proportional to position of the second potentiometer 98 and therefore of the gas flow control valve. These two operational amplifiers 93 and 95, when provided with proper high and low limit reference values will supply a signal to the summing junction 96 necessary to restrict the needle valve excursion and keep the valve from jamming onto the stop or from excessive flow rate during startup. The third operational amplifier 93 prevents excessive flow rate while the fourth operational amplifier 95 prevents jamming.

A fifth operational amplifier 97 is a driver for the output transistors (shown as 2N3439 and 2N5416). These transistors are connected in a configuration commonly known as a totem-pole configuration. The motor 14 is connected to the center of the totem-pole in order to receive proper drive of either positive or negative polarity necessary to drive the valve clockwise or counter-clockwise, thereby closing or opening the valve in response to the voltage present at the summing junction 96.

The motor and valve 14 assembly comprises an ETI/Polaris Industrial Enterprise motor assembly, consisting of a DC motor, the second potentiometer 98 and a reduction gear. The motor 104 rotates the shaft 106. Attached to the shaft 106 is a reduction gear 108. The reduction gear 108 is coupled to another gear 110 which is attached to the shaft 112 of a flow tube 114. The flow tube 114 has a needle valve therein (not shown) and in response to the rotation of the shaft 106 of the motor 104, the shaft 112 of the flow tube is rotated which moves the needle valve, thereby controlling the pressure of the gas passing through the flow tube 114. The preferred embodiment of the flow tube 114 is commercially available as B-125-60 manufactured by Porter Instrument Company.

In normal steady-state operation, the high limit and the low limit operational amplifiers 93 and 95 respectively provide no signal to the summing junction 96. The summing junction 96 therefore combines the pressure transducer feedback, the setpoint reference level, and the gas flowrate rate of change. This combined signal is compared against zero by the fifth operational amplifier 97. Any offset from zero, either positive or negative is supplied to the motor 104 as a DC drive level proportional to the offset from zero. The gas flowrate into the laser 10 is therefore actively controlled so as to maintain gas pressure developed in the laser 10 at a constant and selected level.

The four additional operational amplifiers shown on the schematic are used to trip three pressure level setpoints used for various startup signals and to provide stiff voltage references to the pressure control processor. The voltage reference could be derived elsewhere.

Therefore these four operational amplifiers are not required for proper operation of the pressure control processor.

POWER CONTROL SYSTEM

Referring to FIG. 10, there is shown a schematic block circuit diagram of a power control system 120 used in the laser 10. A percentage of the intercavity power of the laser 10, a beam of coherent electromagnetic radiation, is detected by a power meter 122. The power meter 122 generates a voltage signal which is proportional to the output radiant energy of the laser 10. This power signal is supplied to a first operational amplifier 124 which serves merely to buffer the power signal from the rest of the system 120. The power signal is then passed to a first comparator 126.

A switch 128 has a plurality of settings which the operator can set to the desired power level for the laser 10. A programmable read only memory 130 generates a digital signal in response to the address setting derived from the switch 128. The digital signal is then passed to a DC reference 132 which decodes the value from the PROM 130 and generates a level signal. The level signal from the DC reference 132 is then buffered by amplifier 134. A signal which is representative of the temperature of the ambient is also supplied to the amplifier 134. The signal from the DC reference 132 is supplied to the "+" input of the amplifier 134, while the signal representative of temperature is supplied to the "−" input of the amplifier 134. The signal representative of temperature can be derived from any source, such as a thermistor. The compensated signal is then passed to the first comparator 126. The first comparator 126 is an operational amplifier with the signal from the amplifier 134 being supplied to the "+" input and with the power signal from the power meter 122 being supplied to the "−" of the input. The output of the first operational amplifier 126 is then used to control a reactor drive 136. The reactor drive 136 controls the first, second and third saturable control coils 70, 72, and 74, respetively, as shown and discussed in FIG. 5. By controlling the saturable control coils 70, 72 and 74, the high voltage supply system 68 is thereby controlled. The power level of the high voltage system 68, in turn, controls the degree of discharge current which occurs within the discharge tube 26.

It will be appreciated that, with the power control system 120, active control of the power of the output of laser 10 is achieved. Furthermore, direct power setting of the laser 10 with feedback control has also been accomplished.

LASER BEAM DELIVERY APPARATUS

Referring to FIG. 11, there is shown a laser beam delivery apparatus 140. As previously described, the laser 10 comprises an optical resonator structure 24 which can be of extremely light weight. Thus, the optical resonator structure 24 can be mounted away from the pumps, heat exchangers, etc. In the laser beam delivery apparatus 140 shown in FIG. 11, the optical resonator structure 24 is shown as producing a beam of coherent radiation 28. A mechanical assembly 155 is also shown. The mechanical assembly 155 comprises a plurality of coupled structural members. A first structural member 142 is linked to a second structural member 144 which is linked to a third structural member 148, etc. At each of the linkage of the structural members is a joint, shown for example, as 146 or 150. Within each joint is a mirror. The structural members are preferably of hollow, cylindrical tubes. The beam 28 is aligned to pass substantially through the center of the cylindrical member, to impinge the mirror positioned in the joint. The relative movements of the structural members forming the joint moves the mirror. Thus, the beam 28 can be delivered to the desired location by moving the structural members relative to one another such that the beam 28 reflected from the mirror in the joint will then impinge on the desired location.

More specifically, in FIG. 11, the beam 28 is aligned to pass substantially near the center of the axis of the cylinder of the first structural member 142. The beam 28 is aligned to impinge the first mirror 146 and to reflect therefrom. Beam 28 reflected from the first mirror 146 is aligned to pass substantially through the center of the axis of the second cylindrical structural member 144 and is aligned to impinge a second mirror 150. Beam 28 is then reflected from the second mirror 150 and is aligned to pass through the center of the cylinder of the third structural member 148, and is aligned to impinge a third mirror 152. The beam reflecting from the third mirror 152 is aligned to pass through a telescopic member 154. At the end of the telescopic member 154 is a fourth mirror 156 from which the beam 28 is reflected. The beam 28 is then passed through a focusing lens 158 and is then focused onto the desired location 160.

The entire mechanical assembly 155 is mounted on a frame 162 with motor-driven belts 164 and 166, respectively. The motor-driven belts 164 and 166 propel the mechanical assembly 155 with the optical resonator structure 24 in either the x or the y directions. The movement of the mechanical assembly 155 in the x or y direction moves the beam 28 in the x and y directions. The telescopic member 154 delivers the beam 28 in the z direction.

In the apparatus 140, shown in FIG. 11, the relative alignments of the mirrors 146, 150, and 152 are set at the factory. The beam 28 is aligned to impinge the first, second and third mirrors 146, 150 and 152, respectively, and to be delivered down the center of the telescopic member 154. In operation, only the entire assembly 155 is moved either in the x or y direction and the telescopic member 154 is moved in the z direction. In addition, the telescopic member 154 can be rotated about the z axis, while the focusing lens 158 can be rotated about the y axis.

Referring FIG. 12, there is shown another laser beam delivery apparatus 170. This laser delivery apparatus 170 is similar to the laser delivery apparatus 140. The appratus 170 comprises an optical resonator structure 24 for generating a beam 28 of coherent radiation. The mechanical assembly 172 for delivering the beam of coherent radiation comprises a first structural member 142, a second structural member 144, with a first joint 146 having a mirror therein, and a second joint 150 having a mirror therein, all similar to that described for the apparatus 140. The beam 28 from the resonator structure 24 is aligned to impinge the first mirror 146, to reflect therefrom and to impinge the second mirror 150 and to reflect therefrom to impinge a movable focusing head 174. The movable focusing head 174 comprises a third mirror 176 which is aligned to receive the beam 28 to reflect therefrom and to impinge a focusing lens 178.

The mechanical assembly 172 is mounted on a pair of guide rails 180 and 182 respectively. The optical resonator structure 24, mounted on the mechanical assembly 172 is movable in the Y direction. The movable focusing head 174 is adapted to move along a third rail 184 in the X direction. The focusing action of the beam 28 by the focusing lens 178 delivers the beam 28 in the Z direction.

Referring to FIG. 13 there is shown yet another laser beam delivery apparatus 190. The laser beam delivery apparatus 190 comprises an optical resonator structure 24 for generating a beam 28 of coherent radiation. A mechanical assembly 192 comprises a plurality of coupled structural members, some of which are shown as 142, 144, 148 and 154, all as previously described. Each structural member is linked for relative movement with another adjacent structural member thereby forming a plurality of joints. At each joint, a mirror is positioned to receive the beam 28 and to reflect the beam 28 onto the next joint. A plurality of such mirrors is shown as 146, 150, 152 etc. The mechanical assembly 192 shown in FIG. 13 is capable of an innumerable degree of motion. The rotational degrees of freedom of each of those structural members is shown by the arrows. The movement of the mechanical assembly 192 moves the beam 28 and delivers a reflective beam, the beam 28 which has been reflected through the internal workings of the structural members, through a focusing lens 194 to the desired location 196.

Referring to FIG. 14 there is shown yet another laser beam delivery apparatus 250. The apparatus 250 comprises an optical resonator structure 24 mounted on a mechanical assembly 232. The mechanical assembly 232 has a base 230. A first structural member 231 is rotatably mounted on the base 230. The resonator structure 24 is rotatably mounted on the first structural member 231. The beam 28 (not shown) from the resonator structure 24 is passed through an elastic joint 236 and impinges a focusing head 238. The head 238 is rotatable about the point 236. A focusing lens 240 focuses the beam 28 and delivers it to the desire location.

Each of the foregoing describe the laser beam delivery apparatus, 140, 170, 190 and 250 have been shown with only an optical resonator structure. Of course, as previously stated, the heat exchangers, the vacuum pump, and the power supply, all as previously described as being necessary for the operation of laser 10 must also be provided. For the laser beam delivery apparatus 140, 170, 190 and 250, these other portions are not shown but are connected to the optical resonator structure 24 through flexible coupling, and electrical connectors.

Each of the mirrors positioned in the joint formed by two adjacent structural members of the mechanical assembly portion of the apparatus 140, 170, 190 ro 250, can be a reflective means, of the type as shown and described in U.S. Pat. No. 4,379,622, which in addition to reflecting coherent beam impinging thereon also imparts a certain degree of phase shift to that reflective beam. As shown and as described in U.S. Pat. No. 4,336,439, a circularly polarized beam, formed by a linearly polarized beam which is subsequently passed through a ninety degree (90°) phase shifter has beneficial cutting and scribing properties. Therefore, the reflective mirror can be a reflective mirror which imparts a phase shift to the beam. The reflective mirror can impart ninety degrees (90°), forty-five degrees (45°) or even zero degree (0°) phase shift.

Since each laser beam delivery apparatus 140, 170, 190 and 250, also comprises a focusing head which focuses the beam 28 onto the desired location, the focusing head, which comprises a focusing lens, determines the distance of focus from the head to the desired location. Referring to FIG. 15 there is shown an apparatus for changing the focusing head of the laser beam delivery apparatus. A laser beam delivery apparatus 140 is shown with a laser focusing head 158. A plurality of interchangeable focusing heads: 200, 202, 204 and 206 are positioned nearby. A second mechanical assembly 155 having an arm and a grasp 208 is shown. Mechanical assembly 155 with the grasp 208 is capable of removing the focusing head 158 from the laser beam delivery apparatus 140, and replacing it with a focusing head of choice from the rack of interchangeable focusing heads 201. Therefore, by permitting the interchangeability of the focusing head of the laser delivery apparatus 140, greater flexibility is achieved.

DISTRIBUTIVE LASING SYSTEM

Referring to FIG. 16(a) there is shown a distributive lasing system 210. The distributive lasing system 210 is suitable for use in a factory where a plurality of optical resonator structures 24a, 24b, 24c etc. are in use in different locations of the factory. Each one of the optical resonator structures 24(a-d) can be mounted on a mechanical assembly of the type as previously described. In the distributive lasing system 210 shown in FIG. 16(a) a centralized gas pump 36 and heat exchanger 18 are shown. The lasing medium, the gas, is delivered from the central pump 36 through the head exchanger 18 to each one of the optical resonator structures 24(a-d), via pipes or hoses located throughout the factory. The gas is pumped from the centralized pump 36 and is heated by a centralized heat exchanger 18 and is passed on to a first optical resonator structure 24(a), a second optical resonator structure 24(b), a third optical resonator structure 24(c) etc. The gas is then recycled back to the pump 36. A centralized power supply 212 supplies the necessary electrical power to create the discharge within the discharge tube of each of the optical resonator structures 24(a-d). A backup vacuum pump 36' is shown as a pump to be used in the event of failure of the primary pump 36.

Referring to figure 16(b) there is shown another distributive lasing system 220. Similar to the distributive lasing system 210 shown in FIG. 16(a), the distributive lasing system 220 shown in FIG. 16(b) comprises a centralized pump 36. The pump 36 provides the active lasing medium to each of the optical resonator structures 24 (a-d). Again, the delivery is made through pipes, hoses and the like. The gas is supplied to each of the optical resonator structures 24(a-d) and the exhaust gas from the optical resonators structure is returned to the central pump 36. However, unlike the system 210 shown in FIG. 16(a), a heat exchanger 18(a-d) is provided for heating the gas of the gas lasing medium to each of the optical resonator structures 24(a-d). In this example, if the centralized pump 36 were far away, a heat exchanger 18(a-d) should be placed close to the respective optical resonator structure 24 (a-d) in order to minimize the heat loss from the transmission of the gas from the heat exchanger to the optical resonator structure. Similar to the system 210 shown in FIG. 16(a), a backup pump 36' is also shown. Of course, in addition, a centralized power supply 212 would also be provided.

The advantage of a distributive lasing system 210 or 220 is that near the work site all that is required would be the optical resonator structure 24. Since as previously described the optical resonator structure can be made lightweight and compact, the plumbing and the electrical supply necessary to maintain the lasing action within the optical resonator structure can all be centralized. This would result in elimination of duplication of vacuum pumps and power supplies. In addition, banks of vacuum pumps and of power supplies can be connected in tandem to be switched on in the event of failure of one of the components. From the foregoing description, it can be seen that there are numerous advantages to a distributive lasing system as described.

We claim:

1. An apparatus for delivering a beam of coherent radiation to a desired location, said apparatus comprising:
    a mechanical assembly comprising a plurality of coupled structural members, wherein each structural member is linked for relative movement with an adjacent structural member to form a plurality of joints;
    a mirror means positioned in one of said joints, such that the relative movement of said structural member forming said one joint moves said mirror means;
    laser means in one of said structural members for generating said beam, said laser means comprising:
    a fluid lasing medium which flows through and is enclosed in a support tube and a discharge tube, said support tube being connected to said discharge tube;
    said support tube supports and aligns an optical resonator structure;
    means for maintaining said medium in said support tube at a substantially constant temperature, such that said support tube maintains the alignment of said resonator structure;
    said discharge tube includes means for exciting said lasing medium;
    said discharge tube being positioned in and aligned with said optical resonator structure;
    said discharge tube receives said lasing medium from said support tube, and passes said medium away from said support tube after excitation to an exhaust tube so that said support tube continues to be maintained at a substantially constant temperature.

2. The apparatus of claim 1, wherein said optical resonator structure comprises a first mirror means positioned at one end of said support tube and a second mirror means positioned at the other end of said support tube.

3. The apparatus of claim 1, wherein said fluid is a gas.

4. The apparatus of claim 1, wherein said temperature is above the ambient.

5. The apparatus of claim 1, wherein said discharge tube is positioned parallel to said support tube.

6. The apparatus of claim 1, wherein
    said discharge tube receives said medium from said support tube substantially near the ends of the discharge tube;
    said medium being transported axially through said discharge tube, away from the ends thereof; and
    said medium being passed to the exhaust tube away from the ends of the discharge tube.

7. The apparatus of claim 1 further comprising
    a plurality of discharge tubes, each parallel to said support member, and positioned axially spaced from one another by approximately ninety degrees (90°).

8. The apparatus of claim 1, wherein said support tube is positioned substantially near the center of said optical resonator structure.

9. The apparatus of claim 1 further comprising
    a heat exchanger wherein said medium is passed therethrough; and
    a cooling fluid supplied to said heat exchanger for cooling said medium.

10. The apparatus of claim 9, wherein said maintaining means further comprises
    temperature sensing means positioned to sense the temperature of said lasing medium and for producing a first signal in response thereto;
    electronic signal processing means for receiving said first signal and for receiving a reference signal, representative of a reference temperature, and for generating a drive signal in response thereto; and
    solenoid means positioned to control the flow of said cooling fluid to said heat exchanger; said solenoid means for receiving said drive signal and for controlling the flow of said cooling fluid in response thereto.

11. The apparatus of claim 10, wherein said electronic signal processing means further comprises
    a signal generating means for generating a second signal, said second signal varying repetitively over time:
    means for summing said first and said second signal to produce a third signal; and
    means for comparing said third signal to said reference signal to produce said drive signal.

12. The apparatus of claim 1 wherein said mirror means provides a ninety degree phase shift to said beam to produce a circularly polarized beam from an incident linearly polarized beam.

13. The apparatus of claim 1 wherein said mirror means provides zero degree phase shift from a beam reflected therefrom to a beam incident thereon.

14. The apparatus of claim 1 further comprising:
    means for focusing said beam onto said location, said focusing means in said assembly.

15. The apparatus of claim 14 wherein said focusing means is detachable.

16. The apparatus of claim 15 further comprising means for removing said focusing means and replacing said focusing means with a different focusing means.

* * * * *